United States Patent [19]
Wilkins

[11] Patent Number: 5,934,382
[45] Date of Patent: Aug. 10, 1999

[54] SAND FIGHTER FOR BED PLANTING

[76] Inventor: Walter B. Wilkins, 3113 81st St., Lubbock, Tex. 79423

[21] Appl. No.: 08/916,567

[22] Filed: Aug. 22, 1997

Related U.S. Application Data

[60] Provisional application No. 60/026,105, Aug. 27, 1996.

[51] Int. Cl.$^6$ .......................... A01B 73/04; A01B 79/00; A01B 39/14; A01B 39/00
[52] U.S. Cl. .......................... 172/460; 175/540; 175/554; 175/548
[58] Field of Search .......................... 172/21, 22, 456, 172/311, 540, 554, 548, 553, 556, 460, 776; 403/108

[56] References Cited

U.S. PATENT DOCUMENTS

| | | | |
|---|---|---|---|
| 646,453 | 4/1900 | Naistrom | 172/548 X |
| 1,535,058 | 4/1925 | Taylor . | |
| 1,805,865 | 5/1931 | Benzel | 172/548 |
| 2,012,434 | 8/1935 | Pedersen | 172/548 X |
| 2,176,984 | 10/1939 | Adkinson | 172/548 |
| 2,229,746 | 1/1941 | Krause | 172/548 |
| 2,319,899 | 5/1943 | Silver | 172/548 X |
| 2,604,027 | 7/1952 | Hansen . | |
| 2,691,933 | 10/1954 | Emerson | 172/548 |
| 2,750,724 | 6/1956 | Stephenson . | |
| 2,765,719 | 10/1956 | Day et al. | 172/548 X |
| 2,847,924 | 8/1958 | Quick | 172/548 X |
| 2,864,294 | 12/1958 | Pearson, Jr. | 172/548 X |
| 2,990,893 | 7/1961 | Bland | 172/456 |
| 3,017,183 | 1/1962 | Chalcroft . | |
| 3,180,429 | 4/1965 | Perhink | 172/456 |
| 3,211,482 | 10/1965 | Sorenson . | |
| 3,255,830 | 6/1966 | Groenke | 172/456 |
| 3,321,028 | 5/1967 | Groenke | 172/311 |
| 3,336,617 | 8/1967 | Bosko et al. | 403/108 X |
| 3,554,295 | 1/1971 | Kopaska | 172/456 X |
| 3,669,195 | 6/1972 | Green et al. | 172/456 X |
| 3,680,172 | 8/1972 | Couser | 172/456 X |
| 3,714,992 | 2/1973 | Meier | 172/548 X |
| 3,844,358 | 10/1974 | Shuler et al. | 172/311 |
| 3,995,569 | 12/1976 | Picardot | 172/548 X |
| 4,094,363 | 6/1978 | McCoomb | 172/548 X |
| 4,191,260 | 3/1980 | Klindworth | 172/311 |
| 4,206,816 | 6/1980 | Richardson et al. | 172/548 X |
| 4,355,689 | 10/1982 | Friggstad | 172/311 |
| 4,355,690 | 10/1982 | Jensen et al. | 172/456 X |
| 4,383,580 | 5/1983 | Huxford | 172/21 |
| 4,449,590 | 5/1984 | Williamson | 172/456 X |
| 4,612,997 | 9/1986 | Wilkins | 172/776 |
| 4,840,232 | 6/1989 | Mayer | 172/548 X |
| 4,854,390 | 8/1989 | Stevens | 172/548 X |
| 4,950,102 | 8/1990 | Zeitz | 172/548 X |
| 5,623,998 | 4/1997 | Foster | 172/548 |

FOREIGN PATENT DOCUMENTS

| | | | |
|---|---|---|---|
| 487602 | 1/1976 | U.S.S.R. | 172/456 |
| 494135 | 2/1976 | U.S.S.R. | 172/456 |

OTHER PUBLICATIONS

"Machinery Ideas for Farmers Spray a Wide Swath without Trampling Wheat", Farm Journal, Apr. 1989.

*Primary Examiner*—Christopher J. Novosao
*Attorney, Agent, or Firm*—Wendell Coffee; Mark Scott

[57] ABSTRACT

A plurality of sand fighter rotor units are mounted to a folding frame upon a tractor. Each rotor unit operates in the furrows between rows of crops in an agricultural field. Each rotor unit has a plurality of inboard spiders mounted on an axle between a pair of bearings, and a plurality of outboard spiders mounted on short collars attached to the axle outside the pair of bearings. The prongs of the outboard spiders are shorter than the prongs of the inboard spiders. The outboard spiders are adjustable so that they may be placed close to the growing crops without coming into direct contact with the plants. Attaching the rotor units to a frame such that individual sections of the frame may be folded so that the distal wings of the frame when folded are substantially parallel to a center section.

13 Claims, 5 Drawing Sheets

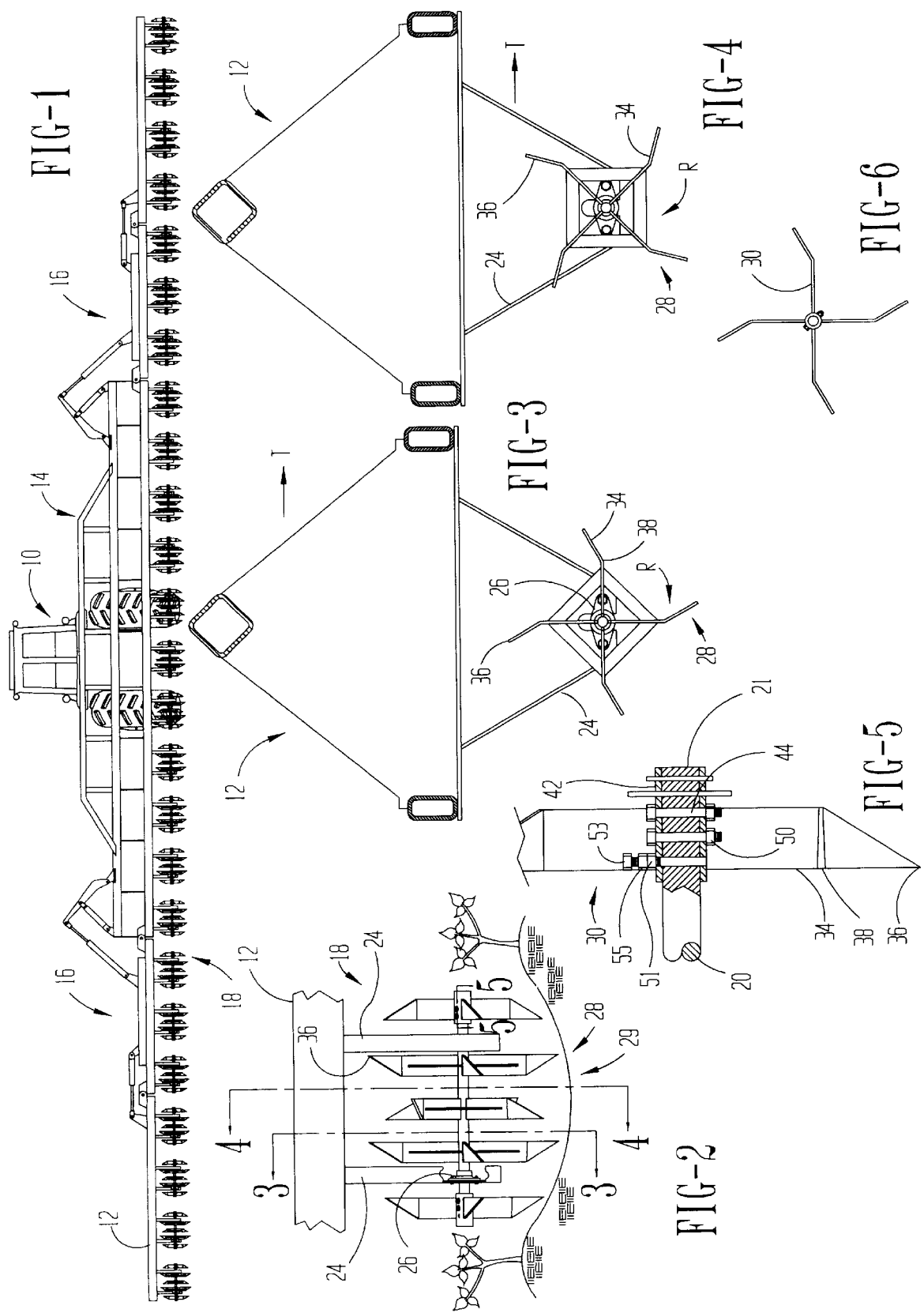

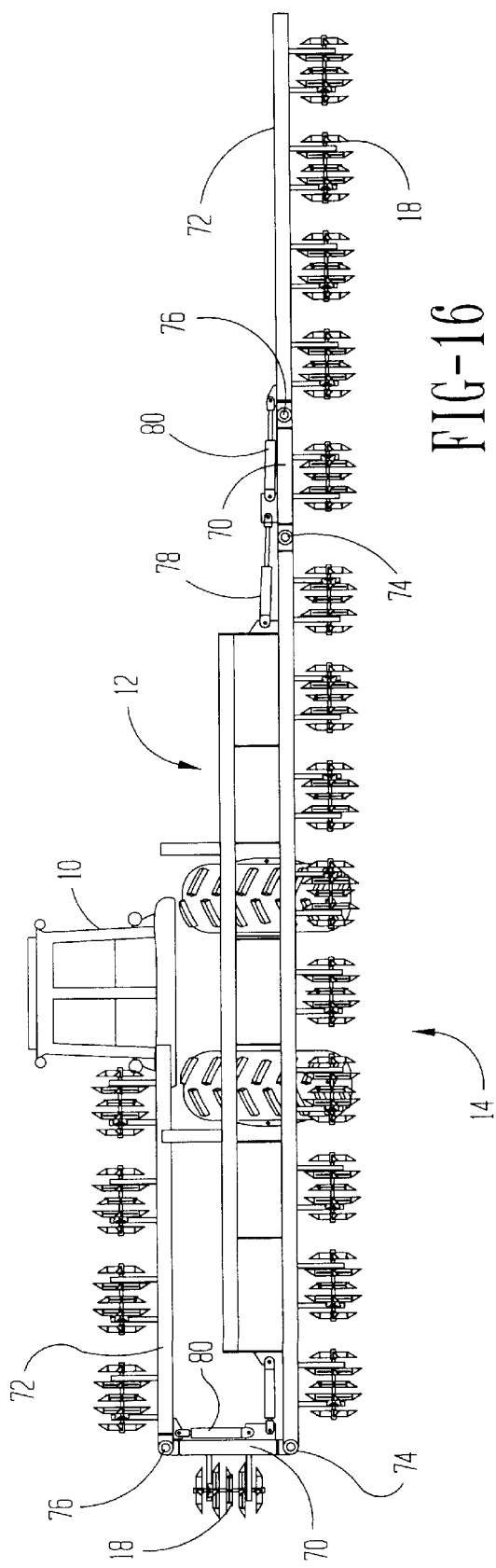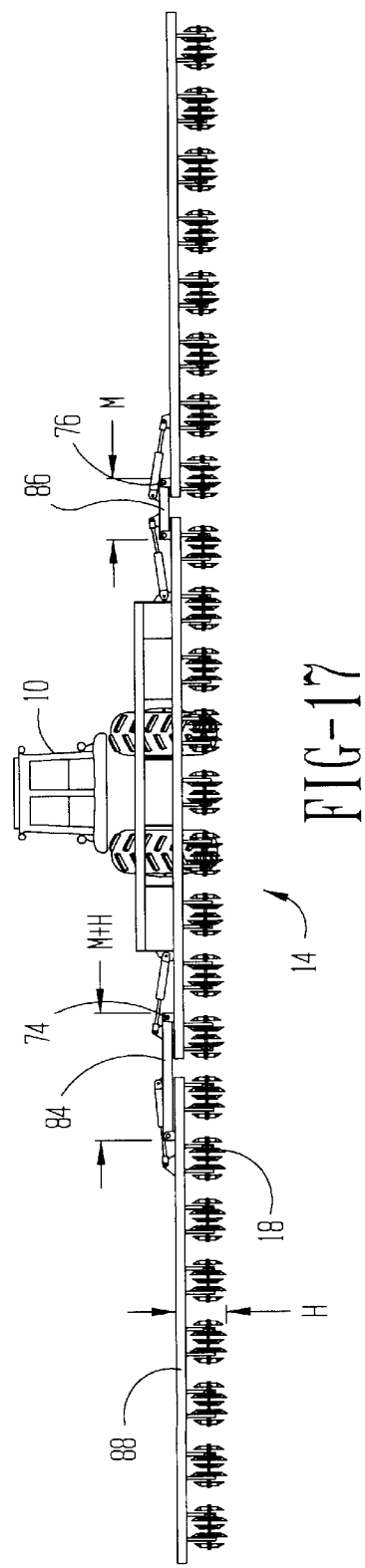

SAND FIGHTER FOR BED PLANTING

CROSS REFERENCE TO RELATED APPLICATION

PROVISIONAL PATENT APPLICATION

Applicant filed a Provisional Application on this subject matter on Aug. 27, 1996, Ser. No. 60/026,105. Specific reference is made to that document.

BACKGROUND OF THE INVENTION (1) Field of the Invention

This invention pertains to farming, and more specifically to an implement for tilling the surface of the soil of an agricultural field to reduce blowing sand and topsoil erosion. Farmers in areas where blowing sand occurs have ordinary skill in this art.

(2) Description of the Related Art

Topsoil in West Texas is sandy. After a heavy rain, the lighter portions of the sand within the soil rise to the surface of the ground. Dry winds cause the sand to blow in the Spring, injuring tender growing crops and causing soil erosion.

To prevent the sand from blowing, a tilling implement called a "sand fighter" has been developed. This implement is designed to turn up "divots," or clumps of damp soil, having heavier components than the dry surface soil, in an area of about four square inches per square foot of topsoil.

These sand fighters are designed as implements to be hauled behind a standard tractor, where they are towed by a chain or hitch. Because the implements are very inexpensive, a farmer may have one sand fighter dedicated to each plot of land, where the sand fighter is left on the plot of land when not in use. Although not heavy, it should be understood that the sand fighters are of large size, which inhibits easily moving them along public roads. Early sand fighters included a frame extending over a large distance, often traversing a strip of land 30 to 40 feet wide. One or more shafts extended over this 30 to 40 feet of land. Kickers spaced along the shaft every 6 to 12 inches included a bent prong extending radially from the shaft, adapted to penetrate the soil about one inch and kick up about one square inch of heavy, moist soil.

Later sand fighters were adapted to be carried on the power lifts of tractors, and could therefore be easily raised and lowered. Some sand fighters were built in sections, having two or more ends, or wings, which folded over. With its wings folded, such a sand fighter would be easier to turn at the end of the field and would be easier to transport over public roads. Such an arrangement is disclosed in WILKINS (U.S. Pat. No. 4,612,997).

One problem with previous sand fighters was that it was difficult to kick up the divots without destroying the young plants. STEVENS (U.S. Pat. No. 4,854,390) discloses an arrangement of a plurality of rotors mounted on a tool bar, with four spiders on each rotor. The implement was designed to travel along the crop rows rather than at an angle thereto as the previous practice. The rotors have a bearing at each end, and extend down between crop rows. As the rotors run through the furrows between beds, the young crops on the bed pass between the rotors, and thus are not disturbed as the sand fighter passes over the field. Due to the construction of the rotors, there is a limit as to how close the spiders can approach the young plants, and there is a significant amount of land close to the rows of young plants which remains untilled, and subject to unchecked blowing sand.

Another problem with previous sand fighters was that when the frames were in the folded position, to facilitate turning at the end of the rows and traveling between feeds, the folded portions of the sand fighter extended a great distance into the air, in other words, they were very high. This large height when in the folded position created the very distinctive habit of coming in contact with high voltage power lines.

The following patents are known to the Applicant and one or more of said patents might be considered relevant to this application:

| HUXFORD | 4,383,580 | May 17, 1983 |
| TAYLOR | 1,535,058 | Apr 21, 1925 |
| HANSEN | 2,604,027 | Jul 22, 1952 |
| STEPHENSON | 2,750,724 | Jun 19, 1956 |
| GROENKE | 3,255,830 | Jun 14, 1966 |
| GROENKE | 3,321,028 | May 23, 1967 |
| SHULER, et al | 3,844,358 | Oct 29, 1974 |
| KLINDWORTH | 4,191,260 | Mar 4, 1980 |
| FRIGGSTAD | 4,355,689 | Oct 26, 1982 |
| WILKINS | 4,612,997 | Sep 23, 1986 |
| STEVENS | 4,854,390 | Aug 8, 1989 |

SUMMARY OF THE INVENTION (1) Progressive Contribution to the Art

Applicant has invented an improved sand fighter which is designed to till an area of soil closer to a row of growing plants than any sand fighter previously which traveled along the rows. This sand fighter includes a plurality of rotor units attached to a frame. Each rotor unit includes one to six spiders between a pair of downwardly extending legs or leg pair, (referred to as "inboard spiders"), and one to four spiders located coaxially with the first set of spiders, but outside of the legs (referred to as "outboard spiders"). These spiders located outside the leg pair are able to come extremely close to the crop, without damage to the plants.

Further, and in combination with the fact the leg pairs of the improved rotor unit may span less distance between them and therefore a greater distance exists between each rotor unit, the applicant has invented an improved frame folding structure that alleviates the problems heretofore seen of having a very tall height when in the folded position.

(2) Objects of this Invention

An object of this invention is to prevent blowing sand from damaging agricultural fields, and more particularly from destroying young crops.

Another object of this invention is to prevent sand from blowing along a row at young plants on a bed without damage to the plants.

Another object of this invention is to prevent sand from blowing across agricultural fields by tilling the soil using a method and structure which allows land to be tilled as close as possible to the growing crop, thereby tilling the maximum amount of land possible.

Another object of this invention is an improved folding frame that has significantly less overall height when in the folded position than as previously been done.

Further objects are to achieve the above with devices that are sturdy, compact, durable, lightweight, simple, safe, efficient, versatile, ecologically compatible, energy conserving, and reliable, yet inexpensive and easy to manufacture, attach, operate, and maintain.

The specific nature of the invention, as well as other objects, uses, and advantages thereof, will clearly appear from the following description and from the accompanying drawings, the different views of which are not necessarily scale drawings.

BRIEF DESCRIPTION OF THE DRAWINGS

FIG. 1 is a rear elevational view of the improved sand fighter according to this application installed on an agricultural tractor. The sand fighter is shown with wings extended.

FIG. 2 is an elevational view of a single rotor unit as shown in FIG. 1 above an operational position aligned with a furrow between rows of a growing crop.

FIG. 3 is a cross-sectional view of an inboard spider taken substantially along line 3—3 of FIG. 2.

FIG. 4 is a cross-sectional view of an outboard spider taken substantially along line 4—4 of FIG. 2.

FIG. 5 is an enlarged view taken substantially along line 5—5 of FIG. 2 with parts broken away to show construction.

FIG. 6 is an elevational view of a spider according to this invention.

FIG. 16 is a rear elevational view similar to FIG. 1 showing an improved folding cylinder arrangement with one wing in the folded position.

FIG. 17 is a rear elevation view similar to FIG. 1 showing a second embodiment of the improved folding arrangement.

CATALOGUE OF ELEMENTS

Figure 7:
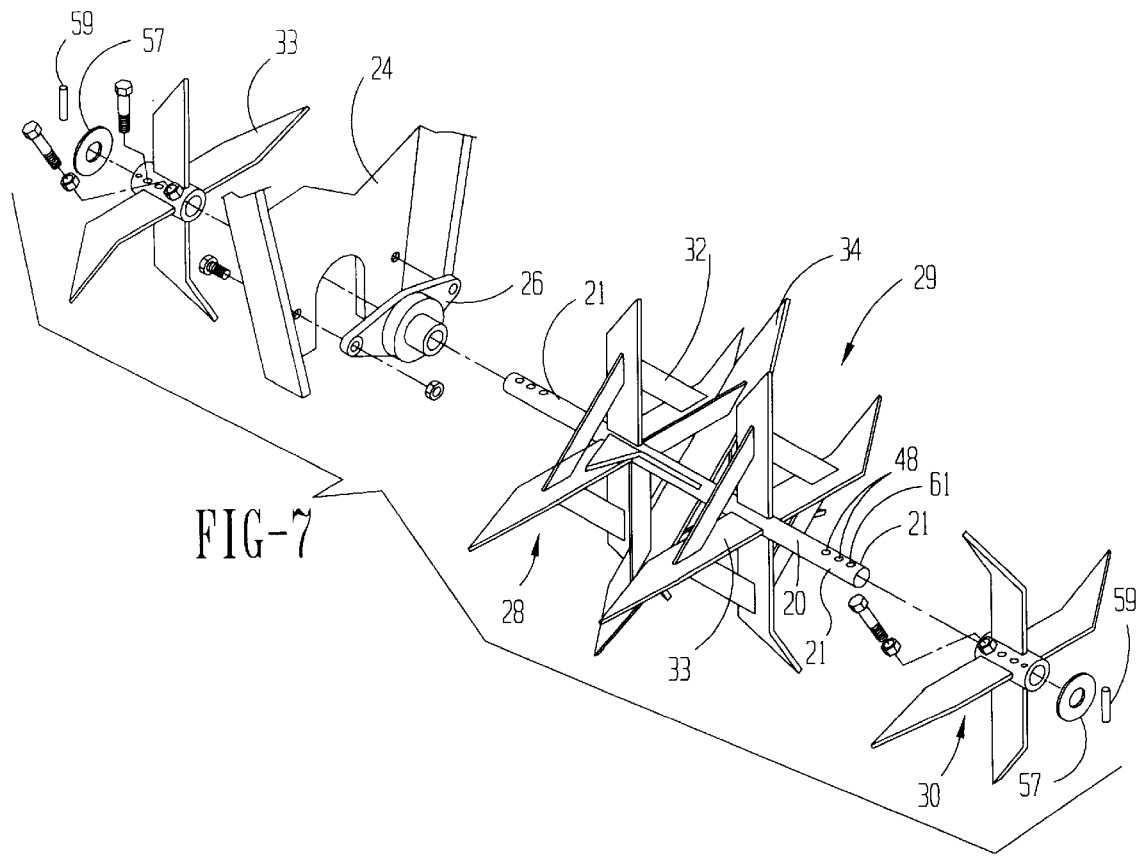
FIG. 7 is an exploded perspective view of the unit shown in FIG. 2.
Figure 8:
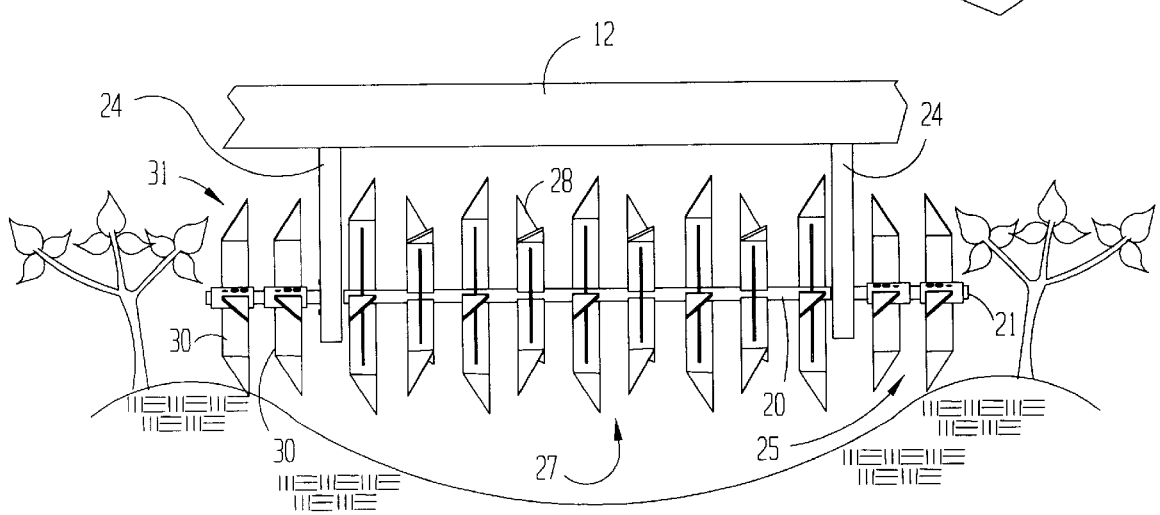
FIG. 8 is a elevational view similar to FIG. 2 showing a unit with nine inboard spiders and four outboard spiders.
Figure 9:
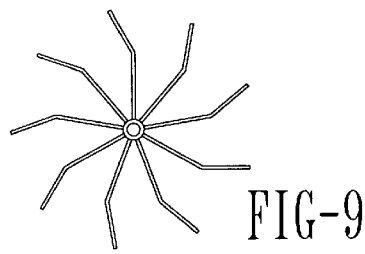
FIG. 9 is an elevational view of a spider according to this invention.
Figure 10:
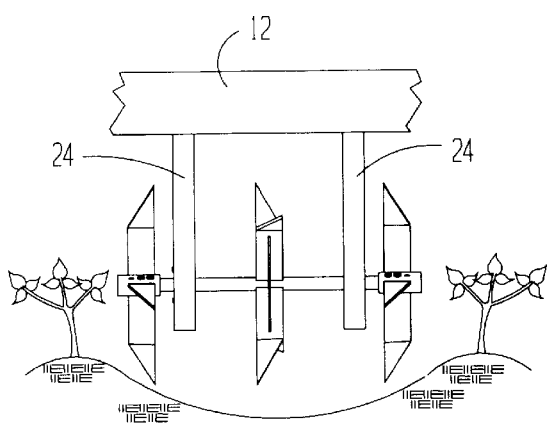
FIG. 10 is a view similar to FIG. 2 showing a unit with one inboard spider and two outboard spiders.
Figure 11:
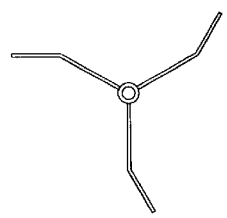
FIG. 11 is a view similar to FIG. 6 showing a spider with three prongs.
Figure 12:
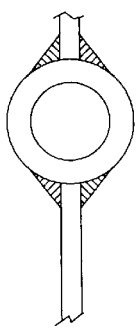
FIG. 12 is a view similar to FIG. 6 showing a spider with two prongs.
Figure 13:
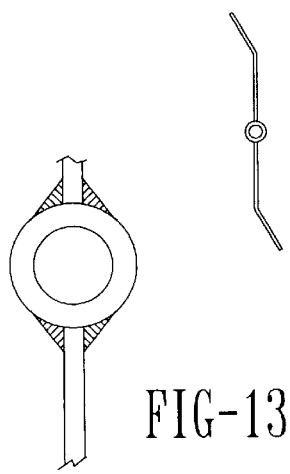
FIG. 13 is a detail of a spider as shown in FIG. 12 showing the connection of the prongs to the center pipe in this instance.

As an aid to correlating the terms of the claims to the exemplary drawing(s), the following catalog of elements and steps is provided:

| 10 | tractor | T | directional travel |
|---|---|---|---|
| 12 | horizontal frame | R | rotation |
| 14 | center section | d | distance spider to row |
| 16 | folding wings | d' | distance spider to row |
| 18 | rotor units | s | span of rotor |
| 20 | axle | r | row width |
| 24 | leg | M | distance |
| 25 | outboard section | H | distance |
| 26 | bearing | | |
| 27 | inboard section | | |
| 28 | inboard spiders | | |
| 29 | spider assembly | | |
| 30 | outboard spiders | | |
| 31 | outboard spider assembly | | |
| 32 | brace | | |
| 33 | wide flat portion | | |
| 34 | prong | | |
| 36 | prong tip | | |
| 38 | bend point | | |
| 40 | terminal lugs | | |
| 42 | tube | | |
| 44 | adjusting bolt | | |
| 46 | adjustment hole | | |
| 48 | diametric washer holes in axle end | | |
| 50 | nut | | |
| 51 | set screw nut | | |
| 53 | set screw | | |
| 55 | jamb nut | | |
| 57 | washer | | |
| 59 | roll pin | | |
| 61 | roll pin hole | | |
| 70 | medial wings | | |
| 72 | distal wings | | |
| 74 | medial hinge | | |
| 76 | distal hinge | | |
| 78 | medial hydraulic cylinders | | |
| 80 | distal hydraulic cylinders | | |
| 82 | folded wings | | |
| 84 | long medial wings | | |
| 86 | short medial wings | | |
| 88 | upper distal wing | | |
| 90 | lower distal wing | | |

DESCRIPTION OF THE PREFERRED EMBODIMENT

Referring to the drawings, there may be seen in FIG. 1 a tractor 10, with a frame 12 attached thereto. The frame is divided into a center section 14, and two folding wings 16 sections. These wings may be extended (FIG. 1), when the frame is in use, or folded for ease of travel when the tractor is moving from one field to another.

When the frame 12 is extended, it may be seen that there are eleven rotor units 18 attached to the center section 14, and seven rotor units attached to each wing 16. The total number of rotor units across the width of the tool bar is twenty-five. As a result, if the rotors are spaced with their centers forty inches apart, the overall width of the tool bar is over 83 feet. It will be understood that a sand fighter may comprise any number of rotor units up to and including twenty-seven. Presently, sand fighters comprising nineteen rotor units or less comprise ninety percent of the market.

A single rotor unit 18 may be seen in FIG. 2. Each of the rotor units includes a leg pair, which are attached to and depend from the frame 12. A leg 24 is part of each leg pair. Each leg 24 extends downward from the frame where there is attached at its terminal end a bearing 26. The two adjacent bearings form a pair. Axle 20 is journalled in the bearings 26. The axle 20 is parallel to the frame 12 and rotates freely within the bearings. That portion of the axle 20 between a leg pair forms an inboard section 27. Those portions of the axle 20 that extend beyond the leg pairs form the outboard section 25.

Up to nine inboard spiders 28 are connected to the axle between the leg pair and bearings 26. Spiders, a cross section of which may be seen in FIGS. 3 & 4 are each constructed of between two and nine spikes or prongs 34, which are attached extending from the axle 20, and evenly distributed about the axle. It will be understood that the term spiders refers generally to any group of prongs extending outward from a center, whether those prongs are attached to a solid core axle or a tube to be journalled over an axle. Preferably, four prongs are used, and they are attached to the central axle such that each prong forms a 90 degree angle with each of the prongs immediately adjacent to it. The spiders are connected to the axle in a staggered conformation, with each spider rotated with respect to adjacent spiders by an angle equal preferably to one-half the angle between adjacent prongs on the same spider.

Although the prongs may be attached to the axle in a variety of manners, welding is preferred. Braces 32 are welded to the surfaces of two adjacent prongs, and extend between the prongs to provide structural support to the spider.

Ideally, the prongs on the inboard spiders are constructed of iron about two to two and one-half inches in width, known as flats, however the prongs could also be of some other cross-sectional shape. Each prong on a single spider is the same length as the other prongs on that spider. Although in the preferred embodiment, all of the prongs on all inboard spiders are the same length, it should be understood that the prongs on the inboard spider or spiders could easily be made to a greater length in order to better follow the contours of the furrows between crop rows on beds. The flat prongs 34 have both a wide flat 33 portion and a short flat portion. As to the inboard spiders 28, the wide flat 33 portion of each prong is attached to the axle 20 such that that the wide flat portion 33 is approximately parallel to a tangential plane of a peripheral surface of the axle 20.

Each prong terminates in a pointed prong tip 36 which is formed by cutting diagonally across the width of the prong, so that the tip forms about a thirty degree angle. The prong tips of the inboard spiders 28 are alternated, so that the point on any prong is on the opposite side of the spider from the diagonal point on the neighboring prong tips on the same spider. This permits for even coverage of the area of surface soil to be tilled.

The prong tips 36 are bent slightly at bend points 38 at the beginning of the diagonal edge of the tip. Each prong is bent in the same direction as shown in FIGS. 3 & 4. The drawings show the direction of rotation of the rotor as "R" and the direction of lateral travel of the tool bar over the surface as "T."

The prongs are mounted on the axle in such a way that in operation, the flat bent end or tip 36 strikes the ground in a flat position as it rolls along the ground. When it emerges from the ground, therefore, it will be in an orientation which is roughly at right angles to the ground, and will be therefore less inclined to throw up loose dirt than would a sand fighter with prongs bent in opposite directions or bent to different angles.

Basically, having the flat bent portion striking the ground will tend to compact the ground so upon rotation that when the prong emerges from the ground it will lift a clod of dirt from the ground and leave a hole in the ground.

If desired the spiders can be run in the opposite direction so that the prongs enter the ground however upon emerging from the ground they will throw more loose dirt into the air and not leave such a prominent hole. If a hole is left in the ground the blowing sand will fill the hole and also the clod above the ground will tend to disrupt the flow of the sand blowing.

In the preferred embodiment, the inboard spiders 28 are solidly connected to the inboard section 27 of the axle 20, and form a single spider assembly 29. The spider assembly 29 is connected to the legs 24 by journalling the axle through bearings 26. This allows the inboard spider unit to rotate freely in the bearings. Ends 21 of axle 20 protrude outside the bearings to form the two outboard sections 25.

Collar or tube 42 (FIG. 5) is fabricated from a section of metal pipe with an inside diameter slightly greater than the outside diameter of axle 20. The length of the tube is usually about four to eight inches.

Outboard spiders 30 are formed by connecting three to nine prongs 34 to the collar, with the prongs radially spaced about the collar at equal angles. The prongs of the outboard spiders are shorter in length than those of the inboard spiders, and therefore, the outboard spiders are smaller in diameter than the inboard spiders 28. This allows the rotor units to conform to the contours of the furrowed ground whenever the rotor is run between crop rows.

The prongs of the outboard spiders 30 are connected to the collar 42 in a similar fashion to the connection of the prongs of the inboard spiders 28 to the axle 20. In most cases, the outboard spiders are small enough in diameter that there is no need to provide additional structural support, and therefore braces 32 are not necessary on the outboard spiders. In most cases, a single spider is formed on each collar, although using a wider collar, two spiders could be connected to the same collar in a coaxial arrangement.

The tips 36 of the prongs 34 on outboard spiders 30 are bent slightly in the same direction as the tips of the prongs of inboard spiders 28. The tips are pointed by cutting diagonally across the prong, so that the tip point forms an angle of about 30 degrees. Unlike the tips of the inboard spiders, however, the prongs of the outboard spiders are cut diagonally so that all of the points on the same spider are on the same side of the spider, namely the side which will be closest to bearing 26. This provides an overall bevelled effect to the outboard spiders. The purpose of bevelling the point away from the plants on the bed or toward the bearing 26, is to turn up divots in the soil as close as possible without disturbing the roots thereof.

The shape of the prongs are more dependent upon the character of the soil. If the soil has more clay and tends to stick together more the prongs will be more pointed, that is to say they will be sharper and used to penetrate the soil more easily. If the soil to be used is more sandy the prongs will be more blunt to compact the soil even more. In extremely sandy soil the prongs may be even rounded rather than pointed.

Adjustment hole 46 is drilled diametrically through one tube 42. (FIG. 5) In ordinary practice, the optimal number of holes on each collar is two. At least two corresponding guide holes 48 are drilled in each axle end 21. The number of guide holes corresponds to the desired number of possible widths for the rotor unit 18.

The outboard spider assemblies 31 are affixed to the axle ends 21 by inserting the axle ends through tubes 42, so that one of the holes 48 in the axle end is aligned with the adjustment hole 46. Adjusting bolt 44 is then inserted through the hole, and secured with nut 50. It will be understood that the lateral position of the outboard spider assembly may be easily adjusted by removing adjustment bolt 44, repositioning the outboard assembly so that adjustment hole 46 aligns with a different hole 48, and then reinserting and securing adjustment bolt 44. Further, a set screw nut 51 is welded above a single hole in the tube 42. A set screw 53 screws through the set screw nut 51 to contact the axle 20. The set screw 53 is further held in place by operation of a jam nut 55 as shown in FIG. 5.

Although the outboard assembly 31 is securely fastened to the axle 20, it is desirable to ensure that the outboard assembly 31 does not break free from and come off of the axle 20. In the event the adjustment bolt 44 should break and the set screw 53 should slip, a large washer 57 is telescoped over each outboard section 25 of the axle 20. The washer 57 is held on the axle 20 via a roll pin 59 that is forced through a roll pin hole 61 drilled diametrically through the axle 20 near the distal ends thereof. If such a catastrophic failure of the adjustment bolt 44 and the set screw 53 were to occur, the outboard assembly 31 would still remain on the axle 20 by operation of the washer 57 and roll pin 59.

Those familiar with sand fighters and the prior art will understand that in some instances, a less expensive unit could be constructed by having the individual inboard spiders 28 welded to a pipe or tube and the pipe journalled over the axle 20 in the form of a solid iron circular rod, said rod being directly and non-rotatably mounted to a leg 24. (FIG. 14) In this event, outboard spider assemblies 31 would be journalled to terminal ends of the shaft extending outside the pairs of legs. Obviously, for a longer life a bearing is preferred, but it is possible to have a cheaper unit by eliminating said bearings.

Varying the lateral displacement of the outboard spiders allows the rotor unit to be made wider or narrower as necessary to insure that the outboard spiders come as close as possible to the growing plants without disturbing them. The sand fighter may thereby cover the greatest possible area of ground for tilling, without causing damage to the growing crops.

Figure 14:
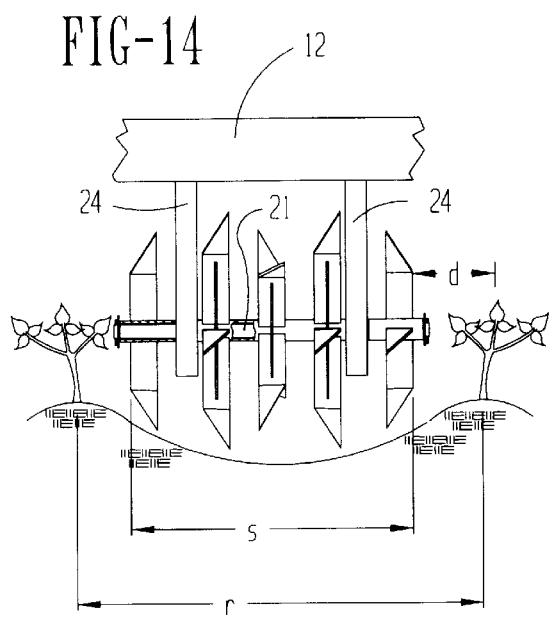
FIG. 14 is a view similar to FIG. 2 showing a modification using spiders on a tube journalled around a non-rotating axle.
Figure 15:
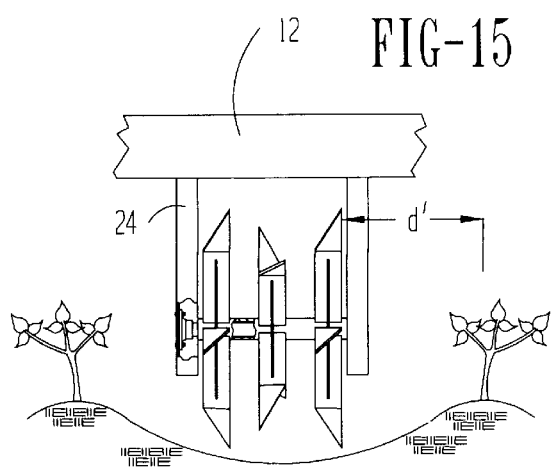
FIG. 15 is a view similar to FIG. 14 with all of the spiders inboard of the hangers.

The advantages of using the outboard spiders can be seen on FIG. 14. Although the figure is not to scale, it will be understood that the distance from the outside spider to the row of the plants is shown as d in FIG. 14 can be less than five inches. Previous to this time, because of the space for the legs 24 to be between the spider and the plant, the closest the spiders were placed to the plant was d' equal nine inches. In such an instance it may be seen that according to the prior art the distance between the closest outboard spider would be eighteen inches. By reducing this distance to less than eight inches it may be seen that the distance between the two adjacent row units would be less than sixteen inches. By reducing this distance to less than five inches it may be seen that the distance between two adjacent row units would be less than ten inches.

Also it may be seen that on forty inch rows and the different rotors being spaced center to center forty inches apart that if eighteen inches were used from rotor to rotor that only twenty-two inches would be available for the width or span of the prior art spiders of the rotor unit.

In FIG. 14 the dimension S indicates the span of the outside spider to outside spider and the distance r is the row spacing between the rows of crops.

Therefore it would be seen that by the prior art, the span of the outer spider to the outer spider on a single row unit would be have been about fifty-five percent. By this invention with the spiders placed with a space between them of less than ten inches that the width from outside spider to spider would be over thirty inches and therefore that this span would be over sixty-five percent of the center to center spacing.

In practical application, the sand fighter is brought to a field to be tilled. The farmer positions the sand fighter at one end of the field, and aligns the rotors 18 of the center portion 14 with the furrows between the crop rows. The farmer then unfolds the wings 16, locking them into position, and adjusts the outboard spider assemblies 31 as described above so that they will come close to the rows of growing plants without actually coming into contact with the plants.

After all adjustments are complete, the farmer drives the sand fighter over the field in a direction of travel "T," and the rotors are dragged through the furrows. The rotors 18 rotate in a direction "R" due to their contact with the ground. The rotation of the rotors causes the prongs 34 to create small divots in the earth of the furrows, turning over moist dirt underneath the drying surface.

This process prevents loose sand from blowing across the field, but also prevents cultivation which might disturb roots of the growing crop. Because the cultivation takes place closer to the growing crop by this method than by any other previously discovered method, the greatest possible area of the field is cultivated, and the blowing sand reduced more than with any other method.

Another embodiment is shown in FIG. 16. There will be seen a tractor 10 and a horizontal frame 12. The horizontal frame consists of a center section 14, two medial wings 70, and two distal wings 72. As shown FIG. 16, there are rotor units 18 attached to each wing and to the center section. It will be understood though that the invention is not limited to having a rotor unit attached to the medial wings 70.

The medial wings 70 are connected to the center section 14 by a medial hinge 74. The medial hinge 74 is located substantially at the top of the center section 14 frame as well as the top of the medial wing 70. Further, there exists a distal hinge 76 between each of the medial wings 70 and the distal wings 72. Hydraulic cylinders are attached to the top each wing and center section. More precisely, a medial hydraulic cylinder 78 connects to the center section 14 and a medial wing 70 which operates to rotate the medial wing 70 in relation to center section 14 to form substantially a ninety degree angle. Similarly, a distal hydraulic cylinder 80 connects the medial wing 70 to the distal wing 72 and operates to rotate the distal wing to form a substantially ninety degree angle between the medial and distal wings. When folded then, the distal wings are physically above the center section and substantially horizontal thereto. One of these folded wings may be seen clearly in FIG. 16.

As mentioned above the most common number of rotor units attached to a frame used by farmers in a field is nineteen; however, up to twenty-five rotor units may be attached to a frame in this configuration. To facilitate turning the sand fighter at the end of a row and transporting the sand fighter between fields, it is desirable that the overall width of a folded sand fighter be approximately the same whether there are nineteen or twenty-seven rows attached thereon. To achieve this desirable feature in the larger, meaning more than nineteen rotor units sand fighters, an overlapping fold is possible.

With wings extending upward, in addition to the problems with the overhead power lines, there is also a problem of having a large amount of weight separated vertically from the hitch of the tractor and the sand fighter. This weight sometimes causes a forward and rearward oscillation when traveling over rough terrain. This oscillation places undo strain upon the hitch. A failure at the hitch would permit the elevated wings to fall forward or rearward with disastrous consequences.

Figure 18:
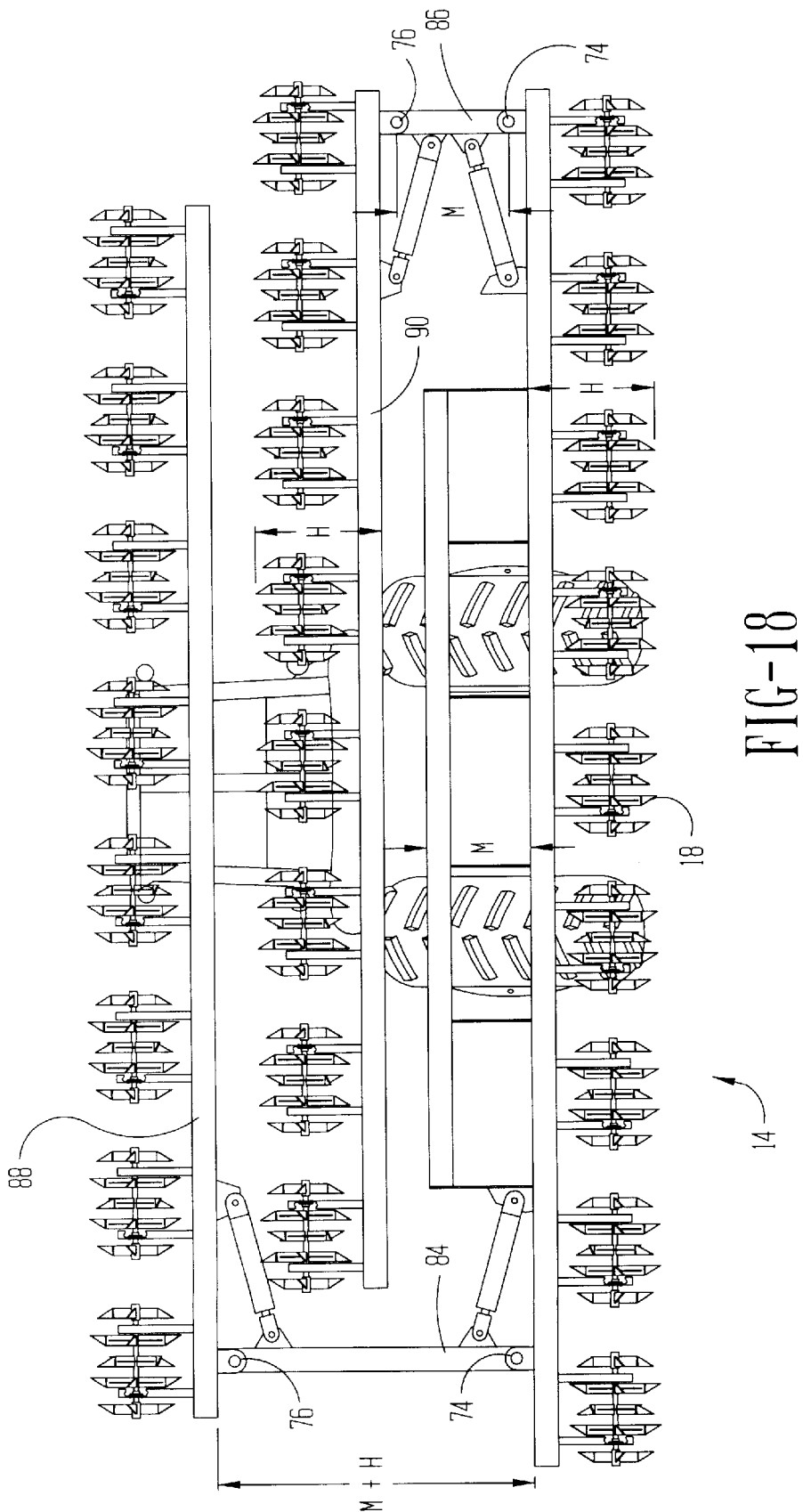
FIG. 18 is a rear elevational view of the second embodiment shown in FIG. 17 with both distal wings folded.

Referring specifically to FIGS. 17 & 18, there will be seen a twenty-five row sand fighter using this overlapping fold method and structure. The overlapping fold is accomplished by having different, or non-equal, medial wing lengths. More specifically, the medial wing 84 is of length longer than the summation of the short medial wing 86 and the overall height H of a rotor unit 18 and frame 12. The overlapping fold creates an upper distal wing 88 and a lower distal wing 90 when in the folded position.

Referring to FIGS. 17 & 18 there may be seen another embodiment for the folding of the wings. In this instance the center section has nine rotor units and each distal wing has eight rotor units for a total of twenty-five rotor units. The medial wings have no rotor units. Also the medial wings are not aligned with the frame 12. In this embodiment the frame is a single box beam, for example, seven inches by seven inches. The medial wing might be above the frame members 12 or might be divided a plate or channel member on each side of the frame 12.

Also it may be seen that the medial hinge 74 is placed inboard from the end of the center section 14. Also it may be seen that the distal hinge 76 is placed outboard of the beginning of the distal wing. If the distances from the end of the units are equal when the distal wings are folded, then the ends of the center section and the two wings will be aligned.

The medial wing 86 on one end of the folded unit will be relatively short. The distance from hinge to hinge on one end will be the distance from the main beam to the top beam which is shown in the drawings as distance M. Upon the other end, the medial wing 84 will be longer. It will be of necessity greater than the distance M as described plus the distance H which is the distance from the top of the distal wing 90 to the bottom of the spiders. Therefore it may be seen that the total width of the unit will be shorter than before because there will be no rotor units extending outward to the sides when fully folded. Also it will be noted that the unit will be extremely compact in its height.

The embodiment shown and described above is only exemplary. I do not claim to have invented all the parts, elements or steps described. Various modifications can be made in the construction, material, arrangement, and operation, and still be within the scope of my invention.

The restrictive description and drawings of the specific examples above do not point out what an infringement of this patent would be, but are to enable one skilled in the art to make and use the invention. The limits of the invention and the bounds of the patent protection are measured by and defined in the following claims.

I claim as my invention:

1. A structure of a sand fighting implement having,
   a) a frame having five contiguous sections,
      i) a center section being an inner most contiguous section,
      ii) two distal wings, each being an outer most contiguous section, and
      iii) two medial wings, each being a contiguous section between the two distal sections and the center section,
   b) each contiguous section being connected by a hinge to the section adjacent to it, thereby creating
      i) two medial hinges, one each being connected between each medial wing and the center section,
      ii) two distal hinges, one each being connected between each distal wing and the adjacent medial wing,
   c) so arranged and constructed that with all the contiguous sections extended their contiguous axis being aligned and normal to a direction of travel,
   d) two medial hydraulic cylinders, each being adapted to rotate one of the medial wings about the respective medial hinge,
   e) a first plurality of rotor units attached to the center section,
   f) a second plurality of rotor units attached to each distal wing,
   g) each rotor unit having,
      i) an axle having a peripheral surface extending between each of two legs of a leg pair,
      ii) a plurality of spiders attached to said axle,
      iii) each spider having a plurality of prongs, each prong having a wide flat portion,
      iv) the wide flat portion of each prong approximately parallel to a tangential plane of said peripheral surface of the axle,
      v) each prong having a bent tip;
   wherein the improvement comprises:
      h) two distal hydraulic cylinders, each adapted to rotate one of the distal wings about the respective distal hinge,
      i) each distal wing to medial wing connection having only one axis of rotation being approximately parallel to the direction of travel,
      j) each medial wing to center section connection having only one axis of rotation being approximately parallel to the direction of travel, such that
      k) each medial wing is substantially perpendicular to the center section when rotated, and
      l) each distal wing is substantially parallel to the center section when rotated, and
      m) a lower face of the distal wing when the frame sections are extended being an upper face of the distal wing when the frame sections are rotated.

2. The structure as defined in claim 1 further comprising:
   n) each medial wing having rotor units attached thereto.

3. The structure as defined in claim 1 further comprising:
   n) each medial wing having no rotor units attached thereto.

4. The structure as defined in claim 1 further comprising:
   n) each of said distal wings having a length,
   o) said center section having a length,
   p) a summation of the lengths of said distal wings being less than the length of said center section.

5. The structure as defined in claim 4 further comprising:
   q) each medial wing having rotor units attached thereto.

6. The structure as defined in claim 4 further comprising:
   n) each medial wing having no rotor units attached thereto.

7. A structure of a sand fighting implement having,
   a) a horizontal frame,
   b) a plurality of matched leg pairs attached to the frame,
   c) said leg pairs extending downward, and
   d) a rotor unit on each leg pair having,
      i) an axle having a peripheral surface extending between each leg of each leg pair,
      ii) a plurality of spiders attached to said axle,
      iii) each spider having a plurality of prongs, each prong having a wide flat portion,
      iv) the wide flat portion of each prong approximately parallel to a tangential plane of said peripheral surface of the axle,
      v) each prong having a bent tip;
   wherein the improvement comprises:
      e) each axle extending beyond each leg of each leg pair, thereby creating,
      f) an inboard section of said axle between each leg of each leg pair, and
      g) two outboard sections of said axle extending beyond each leg of each leg pair,
      h) an outboard spider on each of said outboard axle sections,
      i) a spider assembly formed by a proximal portion of each prong of each inboard spider rigidly attached to the axle on a medial axle portion, j) bearings telescoped over the axle at each end of the spider assembly,
k) said bearings attached to the leg pairs,
l) outboard spiders telescoped over each outboard section of the axle,
m) said outboard spiders' prongs having a length shorter than a length of the prongs of inboard spiders.

8. The structure as defined in clam 7 further comprising:
n) flats forming each prong cut diagonally at a tip, thus forming a point,
o) said point on each outboard spider being on an inboard section side of the prong.

9. The structure as defined in claim 7 further comprising:
n) three adjustment holes in each of said outboard sections,
o) said outboard spiders attached to a tube telescoped to said outboard sections,
p) each of said tubes held in place by an adjustment bolt extending through one of the adjustment holes, and
q) a set screw threaded through each of said tubes to contact the axle,
r) each outboard section of said axle having an end with a washer telescoped over the end,
s) the end of the axle having a diametric washer hole drilled there through outboard of the washer, and
t) a roll pin in each diametric washer hole, forming
u) a means for retaining the outboard spiders on the axle.

10. The structure as defined in claim 9 further comprising:
v) a span of an outer to outer spider distance on each rotor unit being greater than 65% of a center to center spacing of adjacent rotor units,
w) a distance of less than 16 inches existing between the closest outboard spiders on two adjacent rotor units,
x) flats forming each prong cut diagonally at a tip, thus forming a point,
y) said point on each outboard spider being on an inboard section side of the prong.

11. A structure of a sand fighting implement having,
a) a horizontal frame,
b) a plurality of matched leg pairs attached to the frame,
c) said leg pairs extending downward, and
d) a rotor unit on each leg pair having,
   i) an axle having a peripheral surface extending between each leg of each leg pair,
   ii) a plurality of spiders attached to said axle,
   iii) each spider having a plurality of prongs, each prong having a wide flat portion,
   iv) the wide flat portion of each prong approximately parallel to a tangential plane of said peripheral surface of the axle,
   v) each prong having a bent tip;
wherein the improvement comprises:
e) each axle extending beyond each leg of each leg pair, thereby creating,
f) an inboard section of said axle between each leg of each leg pair, and
g) two outboard sections of said axle extending beyond each leg of each leg pair,
h) an outboard spider on each of said outboard axle sections,
i) said axle being formed by a circular in cross-section rod of a length greater than a distance between leg pairs of the rotor unit,
j) a proximal portion of each prong of each inboard spider rigidly attached to an inboard tube whose internal diameter is slightly greater than an outer diameter of the rod,
k) the outboard spider rigidly attached to an outboard tube whose internal diameter is slightly greater than the outer diameter of the rod,
l) said rod extended through an internal diameter of the inboard tube,
m) said rod clamped to a lower portion of the legs of the leg pair,
n) each outboard tube being telescoped over each of the outboard sections of the rod.

12. The structure as defined in claim 11 further comprising:
o) flats forming each prong cut diagonally at a tip, thus forming a point,
p) said point on each outboard spider being on the inboard section side of the prong.

13. The structure as defined in claim 12 further comprising:
q) each outboard section of said axle having an end with a washer telescoped over the end,
r) each end of the axle having a diametric washer hole drilled there through outboard of the washer, and
s) a roll pin in each diametric washer hole, forming
t) a means for retaining the outboard spiders on the axle,
u) a span of an outer to outer spider distance on each rotor unit being greater than 65% of a center to center spacing of adjacent rotor units,
v) a distance of less than 16 inches existing between the closest outboard spiders on two adjacent rotor units.

* * * * *